United States Patent Office 3,336,264
Patented Aug. 15, 1967

3,336,264
PROCESS FOR PREPARING LINEAR POLYESTERS OF HIGH MOLECULAR WEIGHT
Adolf Hartmann, Gessertshausen, near Augsburg, and Peter Kresse, Bobingen, near Augsburg, Germany, assignors to Farbwerke Hoechst Aktiengesellschaft vormals Meister Lucius & Bruning, Frankfurt am Main, Germany, a corporation of Germany
No Drawing. Filed Mar. 26, 1963, Ser. No. 267,905
Claims priority, application Germany, Mar. 31, 1962, F 36,442
6 Claims. (Cl. 260—75)

The present invention is concerned with new catalysts for the preparation of linear polyesters of high molecular weight from dicarboxylic acids and diols, in particular from aromatic dicarboxylic acids and aliphatic diglycols.

It is known that the polycondensation of the aforesaid substances proceeds in a satisfactory manner and yields high average degrees of polymerization only if it is carried through in the presence of small amounts of compounds acting as catalysts. In these processes there are generally used as starting materials the diesters of the acids concerned and of aliphatic alcohols of low molecular weight which are first subjected to an interchange of ester radicals with the diols. The catalysts that are generally applied in order to accelerate the interchange of ester radicals are different from those used for the subsequent polycondensation. As catalysts for the interchange of ester radicals which have hitherto been used there may be mentioned by way of example the acetates of zinc, calcium or manganese and as polycondensation catalysts there may be mentioned the oxides of antimony, lead and bismuth. In most cases one compound of each group of catalyst is used. In many respects this choice is not satisfactory. The reaction products often exhibit yellowish or grey discolorations which are inter alia ascribed to the formation of undesired metal compounds of the diols or to the formation of free metal by reduction processes. Several ways of overcoming these inconveniences have already been proposed. It has, for example, been known to use very pure salts of rare metals, for example, of germanium or gallium, but it has not been possible in this way to solve the problem in a practically satisfactory way. It is in particular difficult and expensive to prepare the said substances with the desired degree of unity.

Now we have found that it is not always necessary to use individual metal compounds but that it is often particularly advantageous to use mixtures which can be prepared by simple measures. We have found in particular that linear polyesters of high molecular weight can be obtained from dicarboxylic acids and diols when a mixture of metal compounds, the metal components of which correspond with respect to their kind and quantity to the mixture of metal oxalates that can be separated from monazite sand, is used as a catalyst for the interchange of ester radicals and the polycondensation or for the polycondensation only.

It is known that the aforesaid operation substantially yields the above-mentioned salts of cerite earths and thorium, the ratio of the mixture being determined by the natural mineral. The natural mineral can be decomposed in various known ways. In most cases monazite sand is treated with hot concentrated sulfuric acid and diluted with water and the metals are precipitated from the acid solution with oxalic acid. For the purpose of purification the oxalates can again be dissolved in a suitable manner and be precipitated. The precipitate is then carefully washed with water until the reaction is no longer acid and then dried, preferably under reduced pressure, until the weight remains constant.

The resulting mixture of the oxalates can be used in the form in which it is obtained as a catalyst for the preparation of linear polyesters of high molecular weight. It is also possible to prepare other salts, for example, the acetates or benzoates, from the mixture or to convert the oxalates at least in part into the complex metal compounds, for example, the complex oxalate of potassium and thorium. The mixture of the metal oxides which can be prepared from the oxalates may also be used. The mixture appears to be particularly suitable for the effect desired, the effects of the individual constituents complementing one another.

The catalysts according to the invention accelerate in particular the polycondensation. Usually they are added to the mixture to be subjected to the interchange of ester radicals in a small quantity, for example, in a quantity of 0.05 to 0.2%, calculated on the weight of the esters, advantageously together with 0.01 to 0.1% of a known catalyst used for the interchange of ester radicals, for example, zinc acetate. Alternatively the catalysts according to the invention may be added to the reaction mixture after the interchange of ester radicals has taken place or they may be used alone. To use them alone is particularly suitable in cases in which the diol esters capable of being condensed have not been prepared by the interchange of ester radicals but in a different way, for example, from dicarboxylic acids and etheylene oxide.

The interchange of ester radicals and the polycondensation are carried through in known manner. The interchange of ester radicals is carried out, for example, by heating the mixture of the dialkyl ester and the excess of diol for a prolonged period to a temperature within the range of 180° to 200° C. until the low-boiling alcoholic component is removed and subsequently distilling off the excess of diol. The polycondensation is usually carried out in several stages by exposing the reaction mass under a pressure below 1 mm. of mercury to a gradually increased temperature within the range of 200° to 300° C., while stirring slowly and uniformly. When the condensation, the course of which can be observed by the energy necessary for the stirring, is complete the molten mass is discharged in water, disintegrated and dried.

In the process according to the invention all acids and diols may be used which are suitable for the preparation of linear polyesters of high molecular weight, preferably dicarboxylic acids the carboxyl groups of which are bound to aromatic nuclei, and aliphatic or cycloaliphatic diols containing 2 to 8 carbon atoms. As examples of the large number of these compounds there may be mentioned adipic acid, sebacic acid, trans-1.2-cyclobutane-dicarboxylic acid, terephthalic acid, 1.4-naphthalene-dicarboxylic acid, 4.4'-diphenyl-dicarboxylic acid, 4.4'-sulfonyl-dibenzoic acid and 2.5-thiophene-dicarboxylic acid; ethylene glycol and its homologs, diethyl glycol, 2.2-dimethyl propane diol and 1.4-dimethylol cyclohexane. ω-hydroxy-carboxylic acids capable of condensing into products of high molecular weight, for example, p(β-hydroxyethoxy)-benzoic acid or 1-(2-hydroxyethyl)-4-benzene-carboxylic acid, are also also suitable for use in carrying out the process of the invention. In general the dimethyl esters of these acids are used for syntheses. Other ester groups are also suitable. In the process of the invention there are preferably used dimethyl terephthalate and ethylene glycol. It is also possible to subject several dicarboxylic acids or dicarboxylic acid esters and several diols to a common polycondensation and to prepare in this way copolyesters.

The catalysts according to the invention have a high activity which enables them to yield within a short time readily moldable products having a high molecular weight and, in most cases, a melting point above 200° C. The polycondensation products are in particular distinguished by the fact that they are as clear as glass and colourless, that they do not undergo any change by reduction processes and that when processed into shaped structures such as filaments, fibres, films or sheets they have a particularly bright appearance. The other physical properties of these products, for example, their strength and elasticity, are as good as, or better than, those of products prepared by known processes.

The following examples serve to illustrate the invention but they are not intended to limit it thereto.

*Example 1*

100 grams of monazite were slowly introduced while stirring into 270 g. of concentrated sulfuric acid which had been heated to about 150° C. The temperature of the mass was increased until $SO_3$ developed and the whole was kept in this state for 5 hours. After cooling, the whole was slowly introduced into a mixture of 2 kilograms of ice water and 60 grams of concentrated sulfuric acid, allowed to deposit and filtered. The residue was washed out with sulfuric acid of 3% strength and the combined filtrates were precipitated with 300 grams of water-containing oxalic acid. The crystalline precipitate was decanted and digested several times with cold, dilute oxalic acid, washed thoroughly with ice water until the oxalate reaction ceased. The whole was then dried under reduced pressure at a temperature within the range of 105° to 110° C. until the weight remained constant. The yield amounted to 90 grams.

0.12 gram of the dried oxalates obtained and 0.08 gram of zinc acetate were added to 450 grams of dimethyl terephthalate and 432 grams of ethylene glycol and the mixture was heated for 3 hours with the exclusion of air to a temperature within the range of 180° to 200° C. During this treatment the methanol distilled off. The pressure in the reaction vessel was then reduced within 20 minutes to 100 mm. of mercury and the temperature was raised within 60 minutes to 275° C. while it was slowly stirred and while the pressure was further reduced to 0.3 mm. of mercury. The molten mass was kept for 2½ hours in this state and was then discharged in cold water under an atmosphere of nitrogen.

A colourless polycondensation product was obtained which was as clear as glass, had a melting point of 264° C. and could easily be spun into stretchable filaments of high strength. The filaments distinguished themselves by a high degree of white.

*Example 2*

25 grams of the metal oxalates which had been prepared according to Example 1 were converted by means of 1 N-sodium hydroxide solution into the mixed hydroxides which were then washed until they were free from oxalate and dried. After heating with excessive acetic acid of a very high degree of purity the whole was filtered, the salt mixture was washed with anhydrous acetone and dried in an exsiccator.

150 grams of dimethyl terephthalate were mixed with 144 grams of ethylene glycol. 0.03 gram of the acetates prepared as described above and 0.02 gram of zinc acetate were added and the whole was heated for 2½ hours under an atmosphere of nitrogen to a temperature within the range of 180° to 200° C. The temperature was then raised within 50 minutes to 275° C. while it was stirred and while the pressure was reduced to 1 mm. of mercury. The melt was kept for another 2½ hours at 275° C. while the pressure was further reduced to 0.2 to 0.3 mm. of mercury. The relative viscosity (measured with a solution of 1% strength in chlorophenol at 25° C.) then amounted to 1.625. The whole was then discharged in water and the condensation product was disintegrated and dried. The polyester could be spun into easily stretchable filaments.

We claim:
1. In the process for preparing linear polyesters of high molecular weight from dicarboxylic acids and diols by (a) subjecting an ester of a dicarboxylic acid and an aliphatic alcohol of low molecular weight and a diol to an interchange of ester radicals at a temperature within the range of 180° to 200° C. and (b) subsequently polycondensing the dihydroxy-alkyl ester obtained under reduced pressure at a temperature within the range of 200° to 300° C. in the presence of a catalyst, the improvement which comprises employing as a catalyst in at least one of (a) or (b) a mixture of metal compounds selected from the group consisting of oxalates, benzoates, acetates and oxides, the metals of which correspond in kind and quantity to the mixture of the metals separated from monazite sand by treatment with concentrated sulfuric acid and precipitation with oxalic acid.

2. The process of claim 1 wherein the catalyst is employed in step (a).

3. The process of claim 1 wherein the catalyst is employed in step (b).

4. The process of claim 1 wherein the ester of a dicarboxylic acid is dimethyl terephthalate and the diol is ethylene glycol.

5. The process of claim 4 wherein the catalyst is employed in step (a).

6. The process of claim 4 wherein the catalyst is employed in step (b).

References Cited

UNITED STATES PATENTS

| | | | |
|---|---|---|---|
| 2,820,023 | 1/1958 | Cavanaugh et al. | 260—75 |
| 3,068,205 | 12/1962 | Smith | 260—75 |
| 3,245,959 | 4/1966 | Roeser | 260—75 |

OTHER REFERENCES

Hackh's Chemical Dictionary, pp. 547.

WILLIAM H. SHORT, *Primary Examiner.*

SAMUEL H. BLECH, *Examiner.*

R. LYON, *Assistant Examiner.*